Dec. 26, 1950 B. J. LAWRENCE 2,535,686

HIGH-FREQUENCY COIL ARRANGEMENT

Filed Dec. 31, 1946

Inventor:
Benjamin J. Lawrence,
by Merilon D. Moore
His Attorney.

Patented Dec. 26, 1950

2,535,686

UNITED STATES PATENT OFFICE 2,535,686

HIGH-FREQUENCY COIL ARRANGEMENT

Benjamin J. Lawrence, Milford, Conn., assignor to General Electric Company, a corporation of New York Application December 31, 1946, Serial No. 719,353

7 Claims. (Cl. 250—16)

Figures 1, 2:
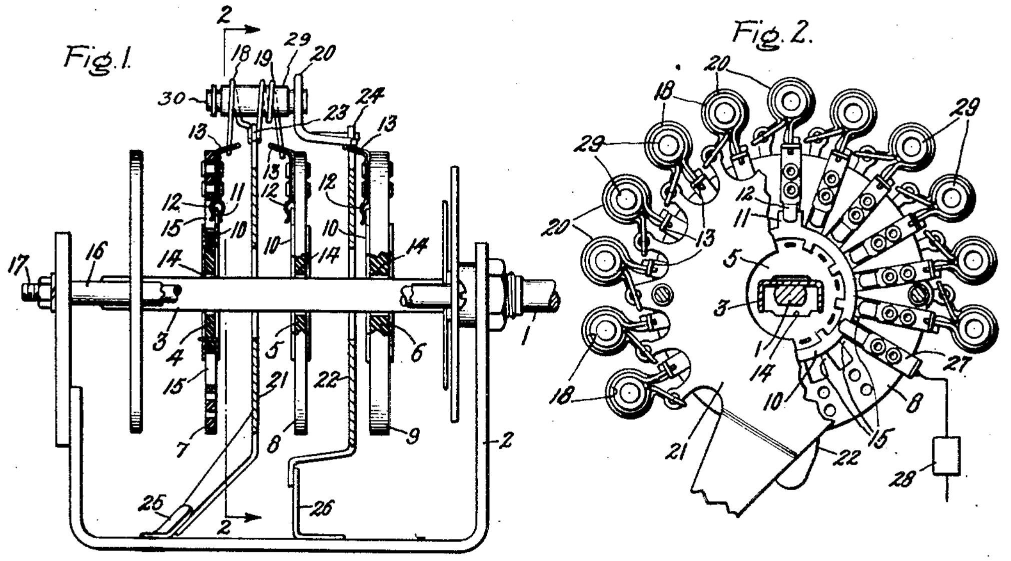

My invention relates to high frequency receivers and, particularly, to receivers arranged for the reception of a large number of pre-selected frequencies. It is the primary object of my invention to effect certain improvements in the circuit arrangements of such receivers.

In television receivers, it is desirable to have circuits pretuned to the separate television channels to be covered and to be able to connect the remaining circuits of the receiver selectively to one of these circuits for the reception of the signals on that particular channel. Such circuits operate at relatively high frequency, varying from frequencies of the order of 40 megacycles to more than 200 megacycles. At such frequency any switching arrangement which is used to connect the receiver to the circuits of a particular channel, in itself includes elements which have an appreciable amount of inductance. On the other hand, it is well known that one of the prime requisites of any high frequency circuit is the maintaining of the inductance of leads and switches to a minimum value in order that the tuning coils used for the resonant circuits of the receiver are themselves of a physically realizable size. In multi-band high frequency apparatus, such as a television receiver of the type described, a gang switch employed for selecting one of, say, 12 or more television channels includes rotor and contact elements which in themselves have a substantial amount of unavoidable inductance. Accordingly, extreme care is required in the construction and arranging of the remaining components of the high frequency circuits so that inherent inductance of the leads and switches is maintained as small as possible.

It is an object of my invention to provide a new and improved television receiver construction in which the high frequency circuits are arranged for rapid selection of a desired one of a plurality of channels.

It is still another object of my invention to provide a new and improved high frequency coil arrangement for a television receiver.

It is a further object of my invention to provide a new and improved multi-band switching arrangement for a television receiver.

It is a still further object of my invention to provide a new and improved low inductance path for the high frequency currents of a television receiver.

In its broad aspect, my invention consists in arranging the inductances of the high frequency, local oscillator, and converter circuits of each desired channel of a television receiver as aligned coils having their axis parallel with the shaft of a switch used for connection to the coils of a selected channel, the coils of various channels being arranged around the circumference of a circle. The ground connections of each of the high frequency coils are made to shields which are arranged between wafers of the switch whose contacts are connected to the coils of the three circuits so that the shields function as supports for the coils and in addition provide low inductance ground leads for the high frequency currents in the coils.

Figures 3, 4:
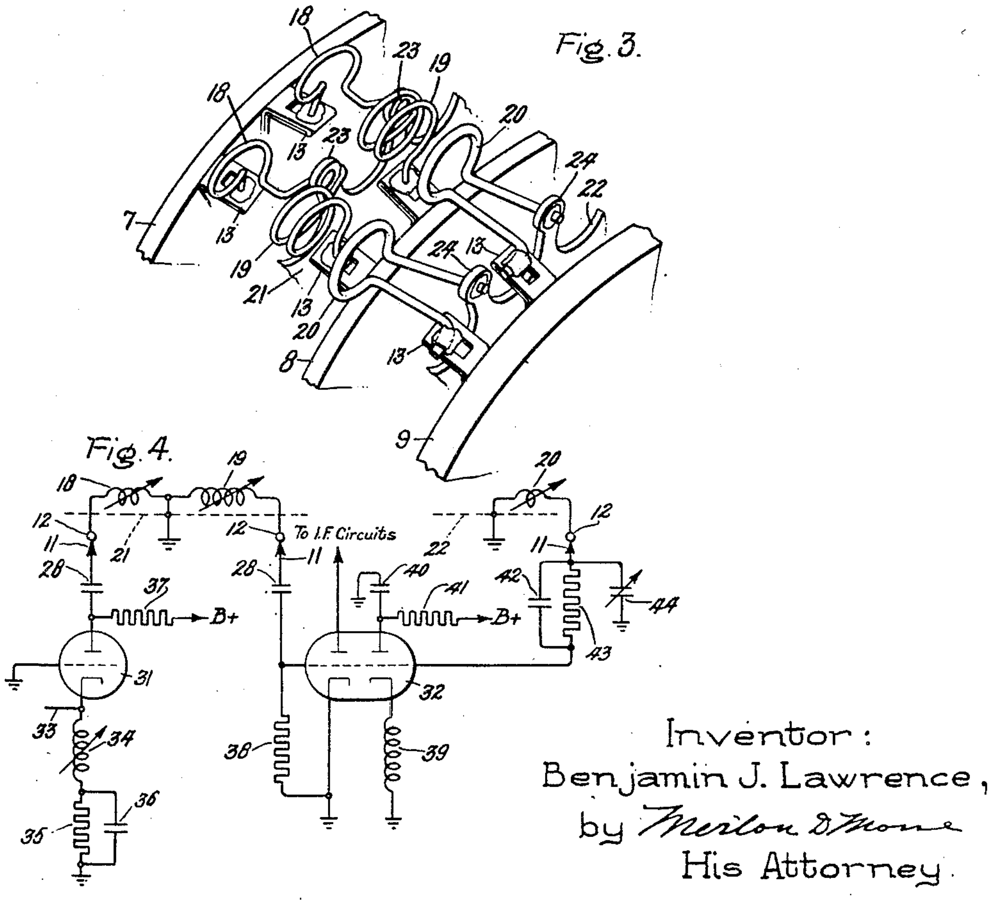

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawings wherein Fig. 1 is a side elevation view of the high frequency circuit and switching arrangement of my invention; Fig. 2 is a sectional view of the arrangement of Fig. 1 taken along the lines 2—2; Fig. 3 is a perspective view of a portion of the high frequency coils of the arrangement of Fig. 1; and Fig. 4 is a portion of the high frequency circuits of a television receiver.

Referring to Fig. 1 of the drawing, I have shown the switch for selecting the high frequency circuits of a desired channel of a television receiver as comprising a horizontal shaft 1, spaced points of which are supported from a U-shaped support 2 which may be a portion of or which may be conductively connected to the chassis of the television receiver. The shaft 1 has a pair of bevelled sides to facilitate attachment thereto of a rectangular sleeve 3 upon which are mounted three dielectric disks 4—6 so that these disks may be rotated by rotation of the shaft 1. The disks 4—6 are substantially coplanar and concentric with three stationary dielectric disks 7—9 and together therewith form the usual wafer of this type of switch. The constructions of the rotatable disks 4—6 are identical and each comprises a dielectric portion upon opposite faces of which are mounted metallic rings 10 each having an outwardly extending contact finger 11 adapted to engage one of a plurality of resilient contacts 12 attached to the disks 7—9. The contacts 12 extend radially from the outer circumference of the disks 7—9 and each is provided with a tab 13 to which is connected one end of a high frequency coil.

The stationary disks 7—9 are substantially identical in construction and are so oriented that their connection to the respective high frequency coils is made by as short a lead as possible. The disks 4—6 have central apertures 14 of a configuration such that they fit snugly over the rectangular sleeve 3. They are held in position relative to the disks 7—9 by the overlapping of the metallic rings 10 with dielectric fingers 15 extending radially inwardly from the disks 7—9. The stationary disks 7—9, in turn, are held in fixed spaced relation by means of tubular spacers 16 positioned between adjacent disks. The spacers 16, in turn, surround bolts 17 which are used to clamp the assembly.

For the high frequency circuits of a television receiver, I provide axially aligned high frequency inductance coils comprising a radio frequency winding 18, a converter grid coil 19, and an oscillator coil 20 all surrounding a coil form 29. One end of the coil 18 is connected by soldering to a tab 13 on the fixed disk 7; one end of the coil 19, to a similar tab on the disk 8; and one end of the coil 20, to a similar tab on the disk 9. In order to shield the various sections of the switch which carry high frequency currents to minimize undesired inductive coupling between the respective elements of the switch, I provide a first metallic plate 21 which is positioned between the wafers 4, 7 and 5, 8 and a second metallic plate 22 which is positioned between the wafers 5, 8 and 6, 9. The opposite ends of the coils 18, 19 are connected to tabs 23 extending radially outwardly from the plate 21 and the opposite end of the coil 20 is connected to a similar tab 24 extending outwardly from the plate 22, so that the plates 21, 22 function as supports for the coils 18—20. The lower ends of the plates 21, 22 are provided, respectively, with terminals 25, 26 of large area which are supported from and conductively connected to the chassis 2.

In Fig. 2, there is shown a vertical elevation view, partly in section, taken along the lines 2—2 of Fig. 1. Thus, in this figure, there is clearly seen the construction of the shield plate 21 having the radially extending tabs 23 to which are connected terminals of the coils 18, 19. Likewise shown is a portion of the rotatable disk 5 and the stationary disk 8. The finger 11 carried by the metal ring 10 on the rotatable disk 5 is shown as engaging one of the contacts 12 carried by the stationary disk 8. Likewise mounted on the disk 8 is an additional contact 27 which engages the metal ring 10. Contact 27 preferably is provided with a very short lead-in conductor connected to a coupling capacitor 28. Capacitor 28 may be connected directly to the appropriate contact of the usual socket for an electron tube so that these connections have a minimum amount of inductance. In Fig. 2, there is shown the switching arrangement for the converter tube to be described later and capacitor 28 is connected to the grid connection of the converter tube socket.

In Fig. 2, there is likewise shown the circular arrangement of the plurality of high frequency windings used for the various channels to which the television receiver is adjusted for reception. These windings, of course, vary in size and number of turns, beginning with the highest frequency winding, shown at the lower left-hand portion of Fig. 2, and progressing in a clockwise direction to the lowest frequency winding, shown at the lower right-hand portion of Fig. 2. Similar connections 27 are provided on the fixed disks 7 and 9 for connection, in the case of the former, to the radio frequency circuits to be described later and, in the case of disk 9, to the local oscillator circuit likewise to be described later.

In Fig. 3, I have shown a perspective view of high frequency coil arrangements for two of the high frequency television channels. In these channels, the radio frequency inductance is constituted by a single turn of wire, one end of the turn being connected to the tab 13 of stationary disk 7 and the opposite end being connected to the tab 23 of the grounding plate 21. The converter grid coils 19, at the frequencies of these channels, each consists of two turns of wire, the high voltage end of each turn being connected to the tabs 13 on stationary disk 8 and the low potential ends being connected to the tab 23 of the grounding plate 21. Each of the oscillator windings 20 consists of a single turn of wire connected between one of the tabs 13 of disk 9 and a tab 24 of the grounding plate 22. The windings 18—20 of each channel are coaxially aligned and adjusted by the dimensions of the turns of each coil and the spacing between the turns to give the desired inductance for the channel in which the coil is employed. At the same time, the spacings between the respective coils in each channel are arranged to provide desired coupling of the oscillator coil with the other coils. The inductance of each coil, as stated, is adjusted by controlling the dimensions of that coil. However, to adjust the radio frequency coil 18, the inductance of the single turn may be either increased or decreased by moving the small circular copper ring 30 on coil form 29 (shown in Fig. 1) either away from or toward the coil 18 without changing the physical size of the coil 18 itself.

Similarly, in the oscillator 20, the two legs supporting the single turn and which are connected to the tabs 13, 24 may be squeezed together or spread apart to obtain the desired inductance. The radio frequency coil resonates with the fixed capacitance of the switch and the circuit elements connected thereto and, by controlling the inductance of this coil, the radio frequency circuit may be resonated to the frequency of the channel in which it is to operate. The coupling between the oscillator coil and the converter coil may be varied by controlling the distance between the coil 20 and the coil 19. In adjusting the circuits, after the dimensions of the respective coils have been adjusted to give a desired inductance, the coils are cemented to the dielectric coil form, shown in Fig. 1, or attached thereto by wax. Any suitable low loss dielectric material may be employed for the form 29. For the higher frequencies, I have found a polystyrene rod to be especially suitable, while, for the lower frequency channels, a phenolic impregnated paper tube gives satisfactory results.

In Fig. 4, I have shown the circuit diagram of the high frequency portion of a television receiver which comprises a radio frequency amplifying tube 31 and a converter oscillator electron discharge device 32. Input signals, as from an antenna and the usual lead-in conductors (not shown), are supplied to the cathode of the radio frequency amplifier 31 by means of a conductor 33. Amplifier 31 has its control electrode connected to ground and its cathode connected to ground through a series circuit comprising an inductance 34 and a resistance 35 shunted by a capacitor 36 which functions to prevent the radio frequency signals from being attenuated. The anode of the radio frequency amplifier 31 is supplied with operating potential from any suitable source, indicated by the legend B+, through an anode resistance 37. The anode likewise is coupled through a capacitor 28 to the radio frequency winding 18. The high potential end of the winding 18 is shown as being connected to a fixed contact 12 which, in turn, is engaged by the movable finger or contact 11. These contacts, of course, are those carried by the disks 4, 7. The low potential end of the winding 18 is connected to the grounding plate 21.

The converter coil 19 has its grounded terminal connected to the shield plate 21 and its high potential terminal connected through contacts 11, 12 of disks 5, 8 and the coupling capacitor 28 associated with disk 8 to the control electrode of the left-hand section of the device 32. The cathode of the left-hand triode section of device 32 is connected to ground and to the control electrode of that section through a grid bias resistor 38.

The oscillator or right-hand section of the device 32 comprises a triode having its cathode connected to ground through an inductance 39 and its anode connected to ground through a by-pass capacitor 40 and to a source of operating potential B+ through an anode resistor 41. The grid or control electrode of the right-hand section is connected to the high potential terminal of oscillator winding 20 through a resistor 43 shunted by a by-pass capacitor 42 and the contacts 11, 12 of the switch wafer comprising disks 6, 9. The opposite terminal of winding 20 is connected to grounding plate 22. The oscillator coil 20 is likewise shunted by a tuning capacitor 44.

It is understood, of course, that each of the twelve or more channels of my television receiver employs respective coils 18—20. Each is adjusted to operate on a desired channel by adjusting the inductances 18, 19 to resonate with the fixed capacity of the switch elements, the electron tubes, and the circuit connections. Such adjustment, as previously pointed out, is obtained by spreading the turns of the respective coils and adjusting the spacing between the coils 18, 19 to obtain a desired response curve for this portion of the circuit. The oscillator winding 20 is adjusted to resonate at a desired frequency by spreading or squeezing the turns of this winding. Thereafter, the spacing between the oscillator coil 20 and the converter coil 19 is adjusted to obtain the desired amount of oscillator excitation in the converter coil circuit so that the desired frequency conversion action is obtained from the left-hand triode section of the electron discharge device 32. The anode of this section is connected to the usual intermediate frequency circuits of a receiver and is so indicated in Fig. 4.

An important advantage of my improved television circuit is that it permits rapid selection of a plurality of predetermined channels. Thus, twelve or more sets of high frequency coils may be arranged around the periphery of the multiposition switch and the receiver circuits accurately tuned simply by switching from one set of contacts to another. This arrangement is made possible by the fact that effective shielding is provided between the different wafers of the switch so that undesirable inductive coupling between the various circuits is kept to a minimum value. At the same time, a very low inductance path to ground for all the high frequency coils is provided permitting the use of larger inductance coils for the different circuits. As a result of my improved construction, conventional switch elements and circuit elements may be employed in the high frequency circuits to facilitate operation of a television receiver.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent in the United States is:

1. The combination, in a television receiver, of a support, a plurality of parallel insulating disks attached thereto, a plurality of contacts mounted radially on each of said disks, a movable contact associated with each of said disks and selectively connectable to said radial contacts, a plurality of stationary coil assemblies arranged around the circumference of said disks and extending transversely therebetween, each of said assemblies comprising a plurality of spaced coaxially aligned coils supported in fixed inductive relation, each of said coils having one of its terminals connected to a radial contact of one of said disks, respective metallic shield plates attached to said support and positioned between each pair of said disks, said coils being supported by said plates and located at radial points lying outside the peripheries of said plates and having their other terminals connected thereto.

2. In a multi-band high frequency receiver, the combination of a plurality of stationary high frequency coil assemblies, each of said assemblies comprising a pair of spaced coaxially aligned coils supported in fixed inductive relation, said assemblies being arranged around the circumference of a circle and having parallel axes, a transverse circular metallic plate of smaller circumference arranged concentric with said assemblies, means for supporting said plate in fixed position, said assemblies being supported from said plate and located at radial points lying outside its periphery, each of the coils of each of said assemblies having one terminal connected to said plate, and switching means disposed on opposite sides of said plate and electrically shielded thereby for selectively connecting the other terminals of the coils of said assemblies to the high frequency circuits of said receiver.

3. The combination, in a high frequency receiver, of a circular metallic plate, a support therefor, a plurality of stationary coil assemblies transversely supported by said plate and located at spaced points radially located outside the periphery thereof, each of said assemblies comprising a pair of fixedly positioned, inductively coupled, spaced coaxially aligned coils having axes parallel with the axis of said plate, each of the coils of said assemblies having one terminal connected to said plate, and switching means disposed on opposite sides of said plate and electrically shielded thereby for selectively connecting the other terminals of the coils of said assemblies in operative relation with the high frequency circuits of said receiver.

4. In a television receiver of the type having a high frequency amplifier stage, a converter stage and an oscillator stage, the combination comprising a pair of coaxially aligned, substantially circular metallic plates, means for supporting said plates in spaced parallel relation, a plurality of coil assemblies arranged around the periphery of one of said plates, each of said assemblies comprising three spaced, fixedly positioned, coaxially aligned coils, two of said coils having a first terminal thereof connected to one of said plates, the other of said coils having a terminal thereof connected to the other of said plates, and switching means for selectively connecting the other terminals of the coils of said assemblies in operative circuit connection respectively with said radio frequency, converter and oscillator stages, the switching means connected with different of said coils being separated by said metallic plates to maintain the inductance connected in series with said other terminals of said coils by said switching means at a small value, said plates forming a low inductance connection with said first terminals.

5. In a television receiver of the type having a radio frequency amplifier stage, a converter stage and an oscillator stage, the combination comprising a plurality of coil assemblies, each comprising three spaced, fixedly positioned, coaxially aligned coils, a pair of parallel coaxial circular metallic plates, means for supporting said plates in fixed spaced relation, said coil assemblies being arranged around the periphery of one of said plates and being supported thereby, each of said coils having one terminal connected to said plates, and switching means shielded by said plates for selectively connecting the other terminals of said coils into operative circuit connection with respective of said stages.

6. In a high frequency receiver having a chassis and apluraliy of high frequency circuits, the combination comprising, a metallic plate inductively connected to and supported in fixed position on said chassis, a plurality of stationary high frequency coil assemblies transversely arranged around the periphery of said plate, each of said assemblies comprising a pair of spaced, fixedly positioned, inductively coupled, coaxial coils positioned outside the periphery of said shielding plate, said coils each having one terminal connected to said plate, whereby said plate forms a low inductance connection between said one terminal and said chassis, and switching means disposed on opposite sides of said plate for selectively connecting the other terminals of the coils of respective ones of said assemblies into operative circuit connection with said high frequency circuits.

7. In a television receiver of the type having a chassis and radio frequency, converter and oscillator stages, the combination comprising a pair of parallel metallic plates supported in fixed position on and conductively connected to said chassis, a plurality of high frequency coil assemblies arranged around the periphery of one of said plates, each of said assemblies comprising three coaxial coils arranged in fixed spaced relation, two of said coils having first terminals connected to one of said plates, the other of said coils having a first terminal connected to the other of said plates, whereby said plates provide low inductance connections between said first terminals and said chassis, switching means for selectively connecting the respective other terminals of the coils of respective assemblies in circuit connection with a respective one of said stages, different of said switching means being separated by said plates, whereby a low inductance circuit connection is provided to the other terminals of said coils.

BENJAMIN J. LAWRENCE.

REFERENCES CITED

The following references are of record in the file of this patent:

UNITED STATES PATENTS

| Number | Name | Date |
|---|---|---|
| 1,394,555 | Ide | Oct. 25, 1921 |
| 1,975,247 | Andres | Oct. 2, 1934 |
| 2,078,908 | Harrison | Apr. 27, 1937 |
| 2,078,909 | Gunther | Apr. 27, 1937 |
| 2,103,035 | Lear | Dec. 21, 1937 |
| 2,227,604 | Smith | Jan. 7, 1941 |
| 2,419,986 | Brown | May 6, 1947 |
| 2,440,037 | Woff et al. | Apr. 20, 1948 |
| 2,497,747 | Valdettaro | Feb. 14, 1950 |